United States Patent

Heldreth et al.

Patent Number: 5,221,096
Date of Patent: Jun. 22, 1993

[54] STATOR AND MULTIPLE PIECE SEAL

[75] Inventors: Mark A. Heldreth, Mentone, Ind.; Stephen R. Buckert, Mesa, Ariz.

[73] Assignee: Allied-Signal Inc., Morris Township, Morris County, N.J.

[21] Appl. No.: 899,827

[22] Filed: Jun. 16, 1992

Related U.S. Application Data

[62] Division of Ser. No. 601,156, Oct. 19, 1990, abandoned.

[51] Int. Cl.⁵ .......................... F01D 1/02; F01D 9/00; F16J 9/16
[52] U.S. Cl. ........................................ 277/227; 277/9; 277/27; 277/236; 415/175
[58] Field of Search .............................. 277/227, 9, 27; 415/139, 191, 216.1, 175, 115; 137/855; 165/9

References Cited

U.S. PATENT DOCUMENTS

| | | | |
|---|---|---|---|
| 3,692,098 | 9/1972 | Barnard | 165/9 |
| 3,719,226 | 3/1973 | Vallance | 165/9 |
| 3,741,288 | 6/1973 | Vallance | 165/9 |
| 3,747,944 | 7/1973 | Roy et al. | 165/9 X |
| 3,752,598 | 8/1973 | Bowers et al. | 415/139 X |
| 3,970,318 | 7/1976 | Tuley | 415/139 X |
| 4,044,822 | 8/1977 | Stockman | 165/9 |
| 4,111,257 | 9/1978 | Wiegard | 165/9 |
| 4,537,024 | 8/1985 | Grosjean | 415/139 X |
| 4,767,260 | 8/1988 | Clevenger | 415/139 X |
| 5,088,888 | 2/1992 | Bobo | 415/139 X |

FOREIGN PATENT DOCUMENTS

| | | | |
|---|---|---|---|
| 2640307 | 3/1978 | Fed. Rep. of Germany | 165/9 |
| 345766 | 5/1960 | Switzerland | 415/139 |

Primary Examiner—William A. Cuchlinski, Jr.
Assistant Examiner—James K. Folker
Attorney, Agent, or Firm—Jerry J. Holden; Robert A. Walsh

[57] ABSTRACT

A multiple piece seal and method for reducing the leakage of air through a narrow gap separating a higher pressure section from a lower pressure in a gas turbine engine. The seal is comprised of a first sealing member having a thickness sufficiently small so that the first sealing member will deform into sealing contact across the gap when subjected to a pressure differential, and a second sealing member having a thickness sufficiently large so as to prevent both sealing members from buckling when inserted the gap.

9 Claims, 2 Drawing Sheets

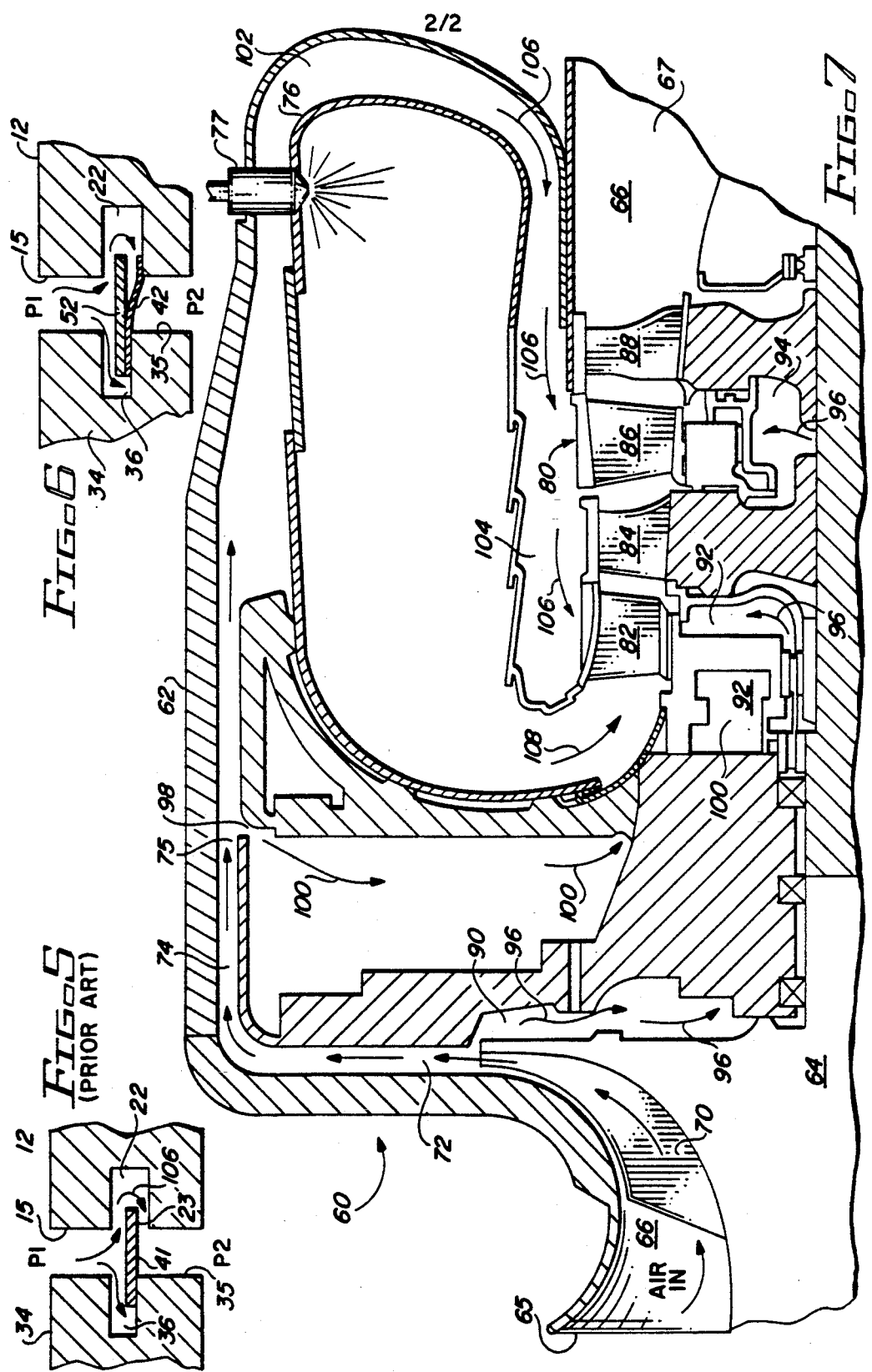

STATOR AND MULTIPLE PIECE SEAL

TECHNICAL FIELD

This application is a divisional of copending application Ser. No. 07/601,156 filed on Oct. 19, 1990, now abandoned.

This invention relates generally to an apparatus and method for reducing the leakage of air through narrow gaps separating sections of higher pressure from sections of lower pressure in a gas turbine engine, and more specifically to a multiple piece seal comprising a first sealing member thin enough to deform into sealing contact across a gap when subjected to a pressure differential and a second sealing member stiff enough to prevent the seal from buckling when inserted into a gap.

BACKGROUND OF THE INVENTION

A gas turbine engine, has a compressor, a combustor, and a turbine. An annular flow path extends axially through these components. Air entering this flow path is pressurized in the compressor, then mixed with fuel and ignited in the combustor resulting in a hot, high pressure gas. The hot gas is expanded across the turbine to produce useful work. A portion of this work is used to drive the compressor and the remainder is used to propel an aircraft with thrust or to drive a free turbine.

A rotor assembly extends axially through the engine and transfers work from the turbine to the compressor. In the turbine, the rotor assembly includes rotor disks having an array of rotor blades radially extending from the disks into the flow path of hot gas. These blades are angled with respect to the approaching flow of hot gas to extract work from the gas and to drive the disks about their axis of rotation.

A stator assembly circumscribes the rotor assembly. The stator assembly has an outer case which contains the working gas and has arrays of stator vanes. Each array of stator vanes extends radially from an outer endwall to an inner endwall crossing the flow path of the working gas upstream of an associated array of rotor blades. The stator vanes direct the working gas into the arrays of rotor blades at angles which optimize the performance of the engine. In order to reduce hoop stresses in the arrays of stator vanes and to make their manufacture and repair easier, it is common practice in the aviation field, to divide each array into discrete, circumferential segments.

The stator vanes are continuously exposed to the hot gas and therefore require cooling. One technique well known in the art for cooling stator vanes consists of forming hollow vanes having openings in both the inner and outer endwall and then taking cooling air from the compressor, passing it around the combustor, and through the openings into the interior of the vanes. In order to prevent the ingestion of hot gas into the structure surrounding the stator, the static pressure of the cooling air is necessarily higher than the static pressure of the hot gas. As a result, the cooling flow is drawn through and out the trailing edges of the vanes where it mixes with the hot gas. However, when this cooling technique is used with stators divided into segments some of the cooling air leaks through the gap between adjacent segments into the hot gas flow. This leakage mixes with the hot gas reducing its temperature which results in a significant drop in the performance of the gas turbine engine. Therefore, there is a need for a sealing apparatus and method that reduces the amount of cooling flow that leaks through the gaps between adjacent stator segments.

A prevailing technique for reducing this leakage flow is to machine a narrow, axial groove into the sides of both the inner and outer endwalls that border a gap. The grooves of circumferentially adjacent endwalls form a slot extending almost the entire axial width of the endwalls. A single, piece seal made of high temperature material is axially inserted into each slot for the entire length of the slot. These seals, generally referred to as feather seals or discouragers, inhibit the flow of cooling air through the gap because the pressure drop across the seals tends to force each seal to seat against the bottom of the adjacent grooves, thereby sealing the gap. However, because of dimensional tolerances inherent in all machining processes, adjacent grooves are unavoidably misaligned or mismatched in the radial direction. If the seal is not flexible enough to conform to this mismatch it will not seat properly against the bottom of adjacent grooves. A mismatch of only a few thousandth of an inch can result in considerable leakage around the seal.

The ability of the seal to conform to the mismatch of the slot and thereby reduce this leakage is directly related to its thickness. A thinner seal is not only more flexible but also will more easily sit against the bottom of the grooves when exposed to the pressure drop across the seal. However, if the seal is too thin it will buckle or deform when inserted into the slot. Consequently, the thickness of these feather seals results in less than optimum sealing.

Accordingly, a need still exists for a seal and method that is flexible enough to minimize the leakage flow through the gap and stiff enough to permit its insertion into a narrow slot without buckling or deformation.

SUMMARY OF THE INVENTION

An object of the present invention is to provide a multiple piece seal that is stiff enough so as not buckle or deform when inserted in a slot separating adjacent stator segments and flexible enough to conform to any mismatch in the slot.

Another object of the subject invention is to provide a method that minimizes the leakage flow through the gap between adjacent stator segments.

The present invention achieves the above-stated objectives by providing a multiple piece seal comprising a first sealing member thin enough to deform into sealing contact across a gap when subjected to a pressure differential and a second sealing member stiff enough to prevent the seal from buckling when inserted into a narrow gap.

These and other objects, features and advantages of the present invention, are specifically set forth in, or will become apparent from, the following detailed description of a preferred embodiment of the invention when read in conjunction with the accompanying drawings.

BRIEF DESCRIPTION OF THE DRAWINGS

FIG. 5 is a cross-sectional view taken along line 5—5 in FIG. 1 having a prior art sealing member.

FIG. 6 is a cross-sectional view taken along line 5—5 in FIG. 1 having a sealing member contemplated by the present invention.

FIG. 7 is a cross-sectional view of a gas turbine engine having segmented stators.

DESCRIPTION OF THE PREFERRED EMBODIMENT

Figure 1:
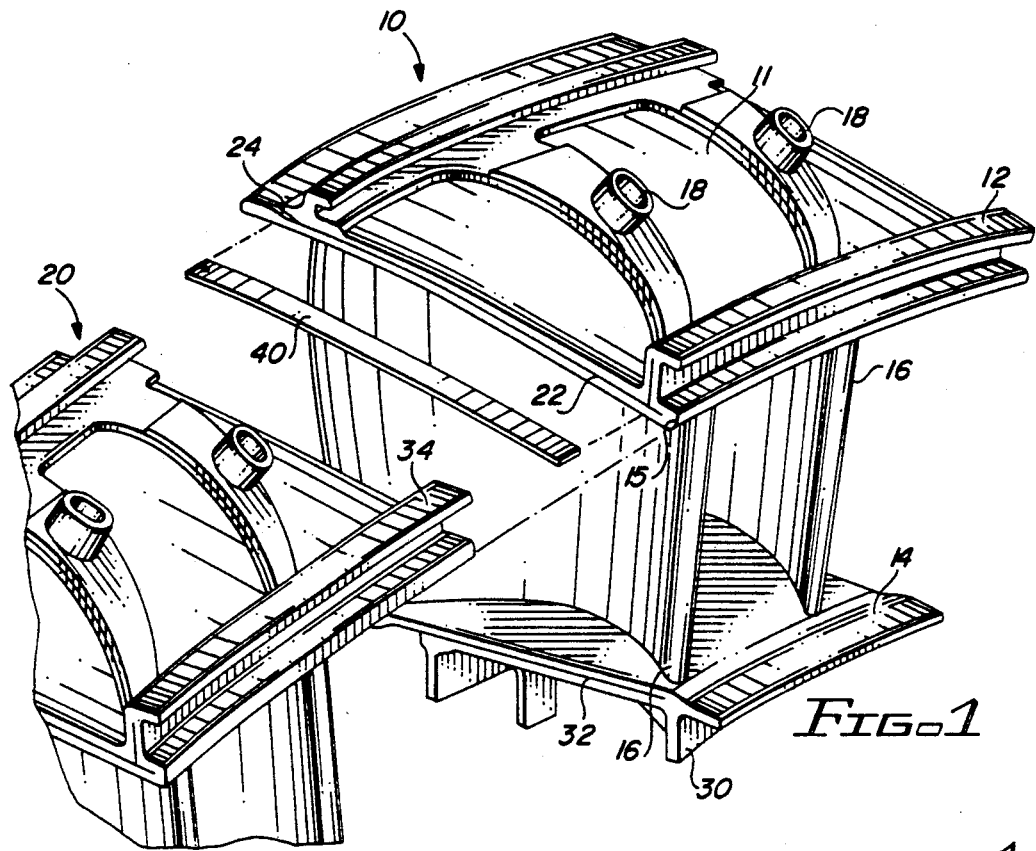
FIG. 1 is an exploded, perspective of two stator segments having a sealing member contemplated by the present invention.
Figure 2:
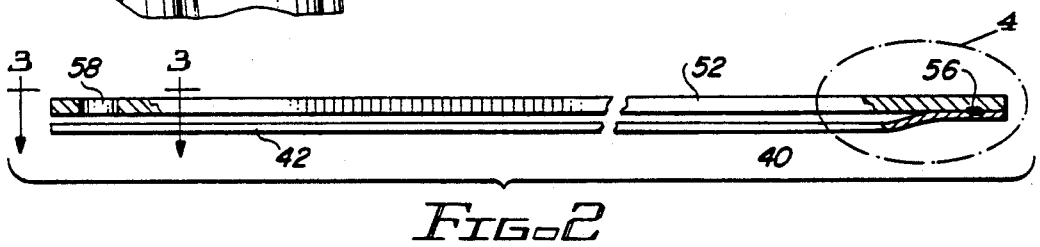
FIG. 2 is a side elevation of the sealing member in FIG. 1 partially cutaway to show details.
Figure 3:
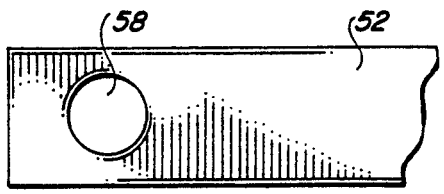
FIG. 3 is a top plan view taken along line 3—3 of FIG. 2.

Referring to the drawings, FIG. 7 shows a gas turbine engine generally denoted by the reference numeral 60. The gas turbine engine 60 has an stator assembly 62 circumscribing a rotor assembly 64 and defining a flow path 66. The flow path 66 extends axially form a inlet 65 to an exhaust 67. Operably disposed within the flow path 66 and arranged in flow series are a compressor 60 having a diffuser 74, a combustor 76 having a fuel nozzle 77, and a turbine 80. The turbine 80 is comprised of a first stage segmented stator vane array 82, a first stage rotor blade array 84, a second stage segmented stator vane array 86, and a second stage rotor blade array 88. While the preferred embodiment is shown having two turbine stages, the number of turbine stages can be increased or decreased without departing from the scope of the present invention.

The gas turbine engine 60 also has a plurality of passageways for bringing cool, uncombusted air from various locations within the engine 60 to the top and bottom sides of the segmented stator vane arrays 82,86. A first passageway 90 extends from the compressor exit 72 to plenum 92 situated beneath segmented stator vane array 82 and to plenum 94 situated beneath segmented stator vane array 86. The cooling air flowing through passageway 90 is depicted by arrows 96. A second passageway 98 extends from the diffuser discharge 75 to the plenum 92 and the air flowing through passageway 98 is depicted by arrows 100. A third passageway 102 extends from the diffuser discharge 75, around the combustor 76 to a plenum 104 situated above the segmented stator vane arrays 82,86. The cooling air flowing through passageway 102 is denoted by arrows 106. The hot gas exiting the combustor 76 is denoted by arrow 108. Because the pressure loss within the combustor 76 is greater than the pressure loss in any of the passageways 90,98, and 102, the static pressure of the cooling air will be greater than the static pressure of the hot gas.

FIG. 1 shows, for example, two stator segments 10 and 20 which could be a part of either stator vane array 82 or stator vane array 86. However, to simplify the following description, the segments 10 and 20 will be considered to be a part of stator vane array 82. The segment 10 has an outer endwall 12 and inner endwall 14 and two hollow vanes 16 disposed between the walls 12 and 14. Along its top surface 11, the stator segment 10 has two cooling air holes 18 which are in fluid communication with the plenum 104 and the interior of the vanes 16. Similar cooling air holes, not shown, are located along the bottom surface of the stator segment 10 and place the interior of the vanes in fluid communication with the plenum 92. The outer endwall 12 has a sidewall 15 in which an axial groove 22 is machined. The groove 22 has an opening 24 and extends almost the entire axial width of the stator segment. The inner endwall 14 has a sidewall 30 in which an axial groove 32 is machined. The groove 32 extends almost the entire axial width of the stator segment 10. Because the grooves 22 and 32 are so narrow relative to the size of the stator vanes, they are depicted by dark lines in FIG. 1.

The second stator segment 20 is shown in part and is identical in its features to the stator segment 10. An outer endwall 34 of stator segment 20 has a side wall 35 with a groove 36 that within machining tolerances, radially aligns with the groove 22, (see FIGS. 5 and 6). Likewise, the lower endwall, not shown, of the stator segment 20 has a side wall with a groove that within machine tolerances radially aligns with the groove 32.

Figure 4:
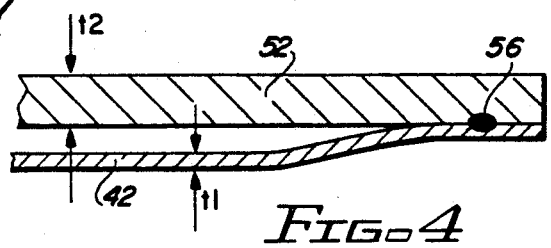
FIG. 4 is an enlarged, fragmentary sectional detail of FIG. 2.

A multiple piece seal 40, (see FIGS. 1-4) is comprised of a first, thinner sealing member 42 situated beneath a second, thicker sealing member 52. The two sealing members 42 and 52, are attached at one end, preferably by a tack weld 56, and extend longitudinally therefrom. Alternatively, the two sealing members 42 and 52 could be brazed together. The thickness of each of the sealing members 42 and 52 is critical, (see FIG. 4). The thickness t1 of sealing member 42 must be sufficiently small so as to allow the sealing member 42 to laterally bend when subjected to a pressure differential and the thickness t2 of sealing member 52 must be sufficiently large so as t allow the insertion of the seal 40 through the grooves 22 and 36 without either sealing member 42 or 52 buckling. Preferably, the thickness (t1) of the strip 42 is about 0.005 inches and the thickness (t2) of the strip 52 is about 0.015 inches. Alternatively, the thickness (t1) is in the range of about 0.002 inches to about 0.006 inches and the thickness (t2) is in the range of about 0.015 inches to about 0.030 inches. The thicker strip 52 has a hole 58 at its unattached end to facilitate the removal of the seal 40 from the grooves 22 and 36. Preferably, the sealing members 42 and 52 are made from high temperature sheet metal.

The advantages of the multiple piece seal 40 over the prior art can best be illustrated by comparing FIG. 5 to FIG. 6. FIG. 5 shows the side wall 35 having the groove 36 of stator segment 20 aligned with the side wall 15 having groove 22 of stator segment 10. The groove 22 is shown positioned slightly below the groove 36 to illustrate the mismatch that occurs due to machine tolerances. P1 is the static pressure of the cooling air in the plenum 104 and P2 is the static pressure of the hot gas 108. Remembering that P1 is greater than P2, the cooling air has a tendency to flow from the plenum 104 into the hot gas stream 108. A prior art seal 41 is shown inserted in the grooves 22 and 36 and because of its stiffness a gap 23 is created between the seal 41 and the bottom of the groove 22. Accordingly, cooling air depicted by arrow 106 leaks around the seal 41. FIG. 6 is identical to FIG. 5 except that the prior art seal 41 is replaced with the multiple piece seal 40. Accordingly, the sealing member 42 bends laterally upon exposure to the pressure differential (P1−P2) substantially eliminating the gap 23 and any leakage flow therethrough.

A method for reducing the leakage of cooling air from a plenum, through a gap between adjacent segments of a segmented stator array, and into a hot gas stream within a gas turbine engine is also provided. First, circumferentially aligned and axially extending grooves are machined in the side walls of adjacent stator segments. A first sealing member and a second sealing member ar sized so that the thickness of the first sealing member is about ⅓ the thickness of the second sealing member. The two sealing members are then attached at one end. With the attached end leading, the two sealing members are inserted all the way into the aligned grooves. Finally, the sealing members are exposed to the pressure differential between the plenum and the hot gas stream and in response thereto the thinner sealing member bends laterally into sealing contact with the bottom of the grooves.

Various modifications and alterations to the above described multiple piece seal will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A gas turbine engine comprising a compressor section, a combustor section and a turbine section arranged in flow series and defining an annular flow path extending axially from said compressor section through said turbine section, said engine further comprising a plurality of air passageways extending from said compressor section to a plenum in said turbine section so that the pressure in said plenum is greater than the pressure in a portion of said flow path disposed within said said turbine section, said turbine section comprising a stator vane array upstream of a rotor blade array, said stator vane array having a plurality of vanes interposed in said turbine section flow path and mounted radially between a segmented outer endwall and a segmented inner endwall, each of said segments, of said inner and outer endwalls, having a narrow gap therebetween, said gap being in fluid communication with said plenum and said turbine section flow path defining a pressure differential across said gap, said stator vane array further comprising a multiple piece seal inserted in each of said gaps, said multiple piece seal comprising a first sealing member having a thickness sufficiently small so that said first sealing member deforms into sealing contact across said gap when exposed to said pressure differential, and a second sealing member having a thickness sufficiently large to prevent both said first and second sealing members from buckling when said multiple piece seal is inserted into said gap said first and second sealing members being attached at one end.

2. The invention of claim 1 wherein said first sealing member thickness ranges from about 0.002 inches to about 0.006 inches and said second sealing member thickness ranges from about 0.015 inches to about 0.030 inches.

3. The invention of claim 1 wherein said first sealing member thickness is about 0.005 inches and said second sealing member thickness is about 0.015 inches.

4. The invention of claim 1 wherein said second sealing member thickness is approximately three times greater than said first sealing member thickness.

5. The invention of claim 1 wherein said first sealing member and said second sealing member are tack welded together.

6. The invention of claim 1 wherein said first sealing member and said second sealing member are brazed together.

7. The invention of claim 1 wherein said second sealing member has at least one hole.

8. The invention of claim 7 wherein at least one of said holes is located near the unattached end of said second sealing member.

9. The invention of claim 1 wherein said first sealing member and said second sealing member are made of high temperature sheet metal.

* * * * *